United States Patent
Oldenburg et al.

(10) Patent No.: US 7,092,705 B2
(45) Date of Patent: Aug. 15, 2006

(54) SYSTEM AND METHOD FOR CHECKING PARAMETER SETTINGS OF RADIO NETWORKS

(75) Inventors: Joannes Willem Maria Oldenburg, Delft (NL); Pierre Arnold, Rotterdam (NL); Hermann Petrus Breurken, Harkstede (NL); Gijsbert Van Veenendaal, Ede (NL)

(73) Assignee: Koninklijke KPN N.V., Groningen (NL)

( * ) Notice: Subject to any disclaimer, the term of this patent is extended or adjusted under 35 U.S.C. 154(b) by 491 days.

(21) Appl. No.: 10/188,538
(22) Filed: Jul. 3, 2002

(65) Prior Publication Data

US 2003/0008645 A1    Jan. 9, 2003

Related U.S. Application Data

(60) Provisional application No. 60/303,933, filed on Jul. 9, 2001.

(30) Foreign Application Priority Data

Oct. 9, 2001    (EP) ................................. 01203820

(51) Int. Cl.
  *H04Q 7/20*    (2006.01)
(52) U.S. Cl. ..................... 455/423; 455/67.11
(58) Field of Classification Search .............. 455/418, 455/419, 560, 420, 432, 33.1, 422, 423, 424, 455/67.11
See application file for complete search history.

(56) References Cited

U.S. PATENT DOCUMENTS

| 5,434,798 A | * | 7/1995 | Madebrink et al. .......... 709/221 |
| 6,085,335 A |   | 7/2000 | Djoko et al. ................... 714/26 |
| 6,185,437 B1 |  | 2/2001 | Bark .......................... 455/560 |
| 2001/0041575 A1 | * | 11/2001 | Amirijoo et al. ........... 455/456 |
| 2002/0138509 A1 | * | 9/2002 | Burrows et al. .......... 707/501.1 |
| 2003/0157935 A1 | * | 8/2003 | Kauhanen ................... 455/436 |

FOREIGN PATENT DOCUMENTS

| DE | 198 13 754 | 9/1999 |
| WO | WO 92/21182 | 11/1992 |

OTHER PUBLICATIONS

Lucian Hirsch, "Einheitliches Verfahren zur Plausibilitätskontrolle der Konfigurationsänderungen von Radioparametern in einem Mobilfunknetz", Siemens Technik Report, Jahrgang 2, Nr. 2, Jan. 1999, pp. 52-56. (with English-language translation).

* cited by examiner

Primary Examiner—Lee Nguyen
(74) Attorney, Agent, or Firm—Michaelson & Associates; Peter L. Michaelson; Alberta A. Vitale (57) ABSTRACT

A method and system for checking modified parameters of components of a radio network. Operational parameters that have been modified are checked on obeying business rules comprising requirements that have been deduced from operational use of the radio network, preferably before they are implemented in the network. The method and system allow application of compressed row techniques in databases comprising the parameters.

32 Claims, 7 Drawing Sheets

| BR_ID | STATE | MODULE | DESCRIPTION | ITERATION LEVEL | MESSAGE |
|---|---|---|---|---|---|
| 2 | 1 | bcf002.br | A BCF of type DE21 has a maximum of 3 BTS's | BCF - BTS | BLOCKING |
| 4 | 1 | bcf004.br | A BCF of type DE45 has a maximum of 1 BTS | BCF - BTS | BLOCKING |
| 5 | 1 | bcf005.br | A BCF has a maximum of 12 TRX's | BCF - TRX | BLOCKING |
| 27 | 3 | bts012.br | A BTS having > 3 TRX's has a additional SDCCH-channel | BTS - TRX | WARNING |
| 28 | 1 | bts013.br | At a combined BCCH 0...2 "no blocks for access grant" have to be used | BTS - CH | BLOCKING |
| 29 | 1 | bts014.br | At a non-combined BCCH 0...7 "no blocks for access grant" have to be used | BTS - CH | BLOCKING |
| 30 | 3 | bts015.br | Check on number of TRX's per LABD-link | BCF - TRX | WARNING |
| 62 | 1 | ho006.br | Preferrably a cell has no neighbours using the same BCCH | BTS - TRX | WARNING |
| 63 | 0 | ho009.br | Neighbours are basically bi-directional | BTS - HO | WARNING |
| 64 | 3 | ho010.br | The sum of handover margin pbgt Should be larger than 0 | BTS - HO | WARNING |
| 79 | 1 | trx001.br | Frequency difference of at least 2 channels of TRX's on same site for different BTS's | BTS - TRX | BLOCKING |
| 83 | 1 | trx004.br | A TRX has a LABD-link | TRX | BLOCKING |
| 85 | 0 | trx009.br | A new TRX is assigned a dummy frequency | TRX | BLOCKING |
| 104 | 1 | ch004.br | The BCCH has to be defined on TRX1 | BTS-TRX-CH | WARNING |

Figure 5

```
Iterate1Start(BCF)
  ResetCounter1
  If [BCF.bcf_type] == "$DE21" Then
    Iterate2Start(BTS)
      IncrementCounter1
    Iterate2End
  EndIf
  If Counter1 > "3" Then
    logBlocking(BCF,BCF of type DE21 exceeds maximum of 3 BTS's)
  EndIf
Iterate1End
```

*Fig. 6A (module bcf002.br)*

```
Iterate1Start(BTS)
  If [BTS.no_of_blocks_for_access_grant1] > "2" Then
    Iterate2Start(CH)
      If [CH.channel_type] == table(chMode,"MBCCB") Then
        logWarning(BTS,To much AccessGrantBlocks have been defined)
      EndIf
    Iterate2End
  EndIf
Iterate1End
```

*Fig. 6B (module bts013.br)*

```
Iterate1Start(BCF)
  Resetcounter1
  Iterate2Start(TRX)
    IncrementCounter1
  Iterate2end
  If [LAPD.BIT_RATE] == "16" Then
    If counter1 > "12" Then
      logBlocking(BCF,BCF exceeds 12 TRX's)
    EndIf
  Else
    If [LAPD.BIT_RATE] == "64" Then
      If counter1 > "10" Then
        logBlocking(BCF,BCF exceeds 10 TRX's)
      EndIf
    EndIf
  EndIf
Iterate1End
```

*Fig. 6C (module bts015.br)*

```
Iterate1Start(BTS)
  Iterate2Start(TRX)
    If [trx.$trx]=="1" and not
is_inTable(BCCHchannels,[TRX.initial_frequency]) Then
      Iterate4Start(HO)
        If [*4:TRX.initial_frequency] == [HO.adj_cell_bcch_frequency] Then
          logwarning(BTS,BTS has neighbour with same BCCH)
        EndIf
      Iterate4End
    EndIf
  Iterate2End
Iterate1End
```

*Fig. 6D (module ho006.br)*

SYSTEM AND METHOD FOR CHECKING PARAMETER SETTINGS OF RADIO NETWORKS

CLAIM TO PRIORITY

This application claims the benefit of our co-pending U.S. provisional patent application entitled "System and Method For Checking Parameter Settings of Radio Networks" filed Jul. 9, 2001 and assigned Ser. No. 60/303,933, which is incorporated by reference herein.

FIELD OF THE INVENTION

The invention relates to a method and system for checking parameter settings of a radio network. More specifically, the invention relates to a method and system for checking various parameters of components of cellular radio networks on the basis of business rules.

BACKGROUND

Figure 1:
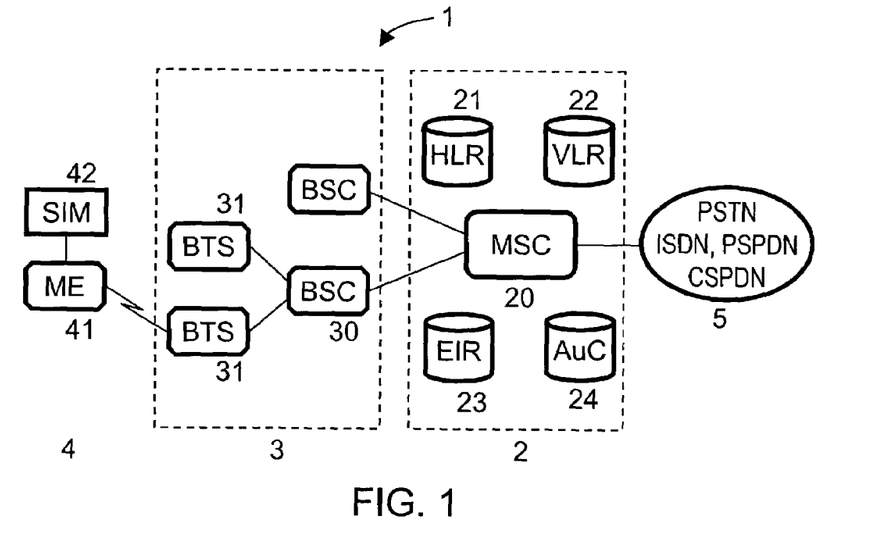
FIG. 1 shows an elementary representation of a GSM radio network.

FIG. 1 shows a schematic representation of a contemporary cellular network 1. The architecture of these cellular networks comprises a network subsystem 2, a base station subsystem 3 and a mobile station 4. Examples of these cellular networks are GSM and DCS and extensions of these networks such as GPRS, UMTS etc. The network subsystems main component involves the mobile switching centre 20 (MSC) providing the interface of the cellular network and wire-bound networks 5 (PSTN, ISDN, ADSL etc.) as well as roaming and call-routing facilities (Home Location Register 21, Visitor Location Register 22, Equipment Identity Register 23 and Authentication Centre 24).

The base station subsystem 3 consists of a number of base stations. The base station subsystem 3 constitutes the connection between a mobile station 4 and the MSC 20. The base station subsystem 3 may be distinguished into two parts, the Base Transceiver Station 31 (BTS) and the Base Station Controller 30 (BSC). The BTS 31 houses radio transceivers that define a cell and handles the radio-link protocols with the mobile station 4. In a large urban area, there will potentially be a large number of BTSs deployed. The BSC 30 manages the radio resources for one or more BTSs 31. It handles radio-channel set-up, frequency hopping, and handovers.

The mobile station 4 is the mobile equipment that enables a user to communicate with others through the cellular network. A mobile station 4 usually comprises mobile equipment 41 and a Subscriber Identity Module 42 (SIM).

As the complexity of cellular networks increases, flexible operation of these networks becomes more difficult. Configuration and reconfiguration of a cellular network is complex since the parameter settings of the different components of the cellular radio network affect each other. U.S. Pat. No. 5,434,798 of Ericsson describes a reconfiguration method and apparatus in which the cell parameters of particular mobile switching centres in a network are copied to a database, and the copied parameters are stored. A set of proposed changes to the stored parameters is prepared and the consistency of the prepared set of proposed changes is verified. Alterations to the set of proposed changes responsive to the verification are made and the verified set of proposed changes is copied to the concerned mobile switching centres. The verified set of proposed changes is then introduced into the network. An up-to-date image of the cell parameters in the mobile switching centres in the network is maintained in a system parameter database.

Problem Definition and Aims of the Invention

Typically, a cellular radio network comprises several MSCs and a larger number of base stations. Operation of such cellular radio networks requires a high degree of flexibility in the sense that configuration and reconfiguration of the cellular network has to be possible within a limited period of time and with a high degree of accuracy. Such a reconfiguration of a radio network can be permanent or temporary. Reasons for such a reconfiguration are numerous, e.g. a temporary cell split needed to deal with an expected increase in traffic due to an event or the permanent integration of new elements both affecting the settings of already existing elements in the radio network. Therefore, sophisticated methods and systems are required that administer the parameter settings of the various components, e.g. the BTS or BSC, of the cellular radio network and change the parameter settings of those components. Examples of parameters that can be changed include cell type, cell designation, cell direction, signal strength, signal to noise ratio, etc. Moreover, means have to be provided in order to check the consistency of the proposed parameter changes before the changes are implemented in the cellular network.

The reconfiguration method and system as revealed by the '798 patent can be improved with regard to, inter alia, the performed routine to check the consistency of proposed parameter changes.

More particularly, an improvement relates to the hierarchical levels that can be checked. The method of the '798 patent checks the consistency of the proposed parameters only with regard to cells and handovers. Thus, only a very limited part of the network hierarchy is checked, resulting in a less reliable and efficient control of the radio network.

Another problem of the method described in the '798 patent relates to the type of rules used in performing the consistency check. The rules used in performing this check originate solely from technical requirements derived from cellular network technology. There is no possibility to apply rules derived from operational practice as well. Moreover, it is not possible to deviate from the technically sufficient parameter setting requirements if operational practice experience reveals a different more preferable technical parameter setting.

Still another problem of the method described in the '798 patent is that, in performing the consistency check, only pre-programmed rules are used. This limitation decreases the flexibility of the system for the operator that exploits a cellular radio network. It may be that such an operator is not satisfied with the requirements for the various parameters defined by the supplier of the network. The operator may want to define the requirements, including the technical requirements, himself.

The present invention aims to provide a method and system to check the consistency of the proposed changes of parameters.

SUMMARY

The present invention provides a method and system that improve the reliability, flexibility and accuracy required for operating cellular radio networks.

It is an object of the invention to be able to verify the proposed changes in the parameter settings in all hierarchical levels of the radio network and of substantially every, i.e. any desired, relationship between parameters in the same or different hierarchical level of the radio network. By enabling verification on every hierarchical level, the control and reliability of the network is significantly improved if changes in the parameter setting are to be implemented.

It is another object of the invention to enable the use of rules developed from operational practice in the verification of the parameter settings in one or more of the levels of the network hierarchy and relationship between elements in the cellular radio network. Hereafter, the rules used to verify the parameter settings will be referred to as business rules. These business rules comprise rules related to technically preferable requirements as well as rules derived from operational practice.

It is still another object of the invention to enable the use of programmable rules in the verification of the proposed changes of the parameter settings in one or more hierarchical levels and relationship of elements in the radio system. These rules may preferably be programmed by the operator of the radio network or at least being ordered or influenced by the operator of the radio network. Moreover, also the error messages, if the rules are not obeyed, may be operator-programmable.

DESCRIPTION OF PREFERRED
EMBODIMENTS OF THE INVENTION

For the purpose of teaching the invention, preferred embodiments of the method and devices of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

Figure 2:
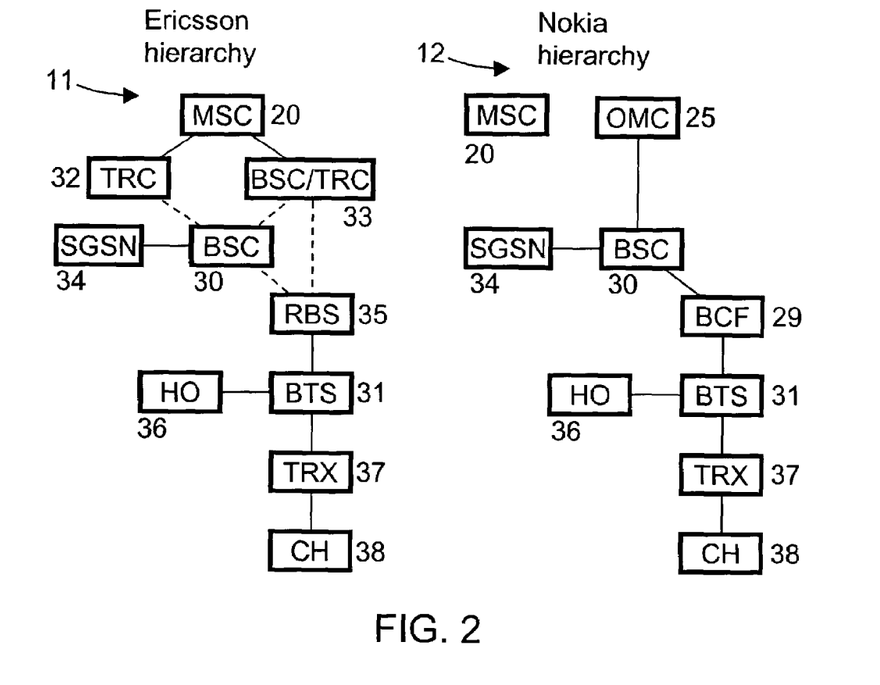
FIG. 2 shows examples of representations of different hierarchies the invention is able to handle.

A radio network 1, as schematically shown in FIG. 1 may be represented alternatively by a network hierarchy 11,12 comprising different levels. These levels correspond to physical as well as non-physical parts of radio network 1. The hierarchies 11,12 may differ in their representation between several commercial suppliers of these kinds of radio networks 1. As an example, FIG. 2 shows the network hierarchies of Ericsson 11 and Nokia 12 radio networks 1. It can be observed that the Ericsson and Nokia hierarchies 11 and 12 differ in some aspects, but are equivalent in other aspects.

The Ericsson hierarchy 11 comprises a MSC level 20. The MSC 20 is coupled to a transcoder 32 (TRC) and a BSC/TRC 33. The next level comprises the BSC 30. This BSC 30 may be linked to the TRC 32 or the BSC/TRC 33. In the case that a GPRS radio network should be represented an additional element, Service GPRS Support Node 34 (SGSN) is introduced. The SGSN 34 may comprise different hierarchical levels itself. Next, the Ericsson hierarchy 11 shows a Radio Base System 35 (RBS) level. The RBS may be linked to a BSC 30 or a BSC/TRC 33. Afterwards, a handover 36 (HO) and the BTS 31 are shown. Finally, the Ericsson hierarchy 11 exhibits a transceiver level 37 (TRX) and a channel level 38 (CH)

The Nokia hierarchy 12 differs from the Ericsson hierarchy in some aspects. First, the TRC 32 and BSC/TRC 33 level are replaced by an Operational Maintenance Centre 25 (OMC). Moreover, whereas the Ericsson hierarchy 11 contains TRC and BSC/TRC levels, the Nokia hierarchy implements the OMC-level 25. The Ericsson hierarchy 11 and the Nokia hierarchy 12 are equivalent below the RBS 35 and the BCE 39 respectively.

It is noticed that the network hierarchies of Ericsson 11 and Nokia 12 are only examples. Other network suppliers might handle different network hierarchies. The method and system according to the invention are suited for these network hierarchies as well.

It is one of the objects of the invention to provide a method and system to handle the parameter settings in these kinds of hierarchies. More specifically, a method and system are provided to supply operators of cellular radio networks with a control facility on each and every hierarchical level and on relationships between elements of the radio network before changes in the parameter settings are implemented into the network.

Figure 3:
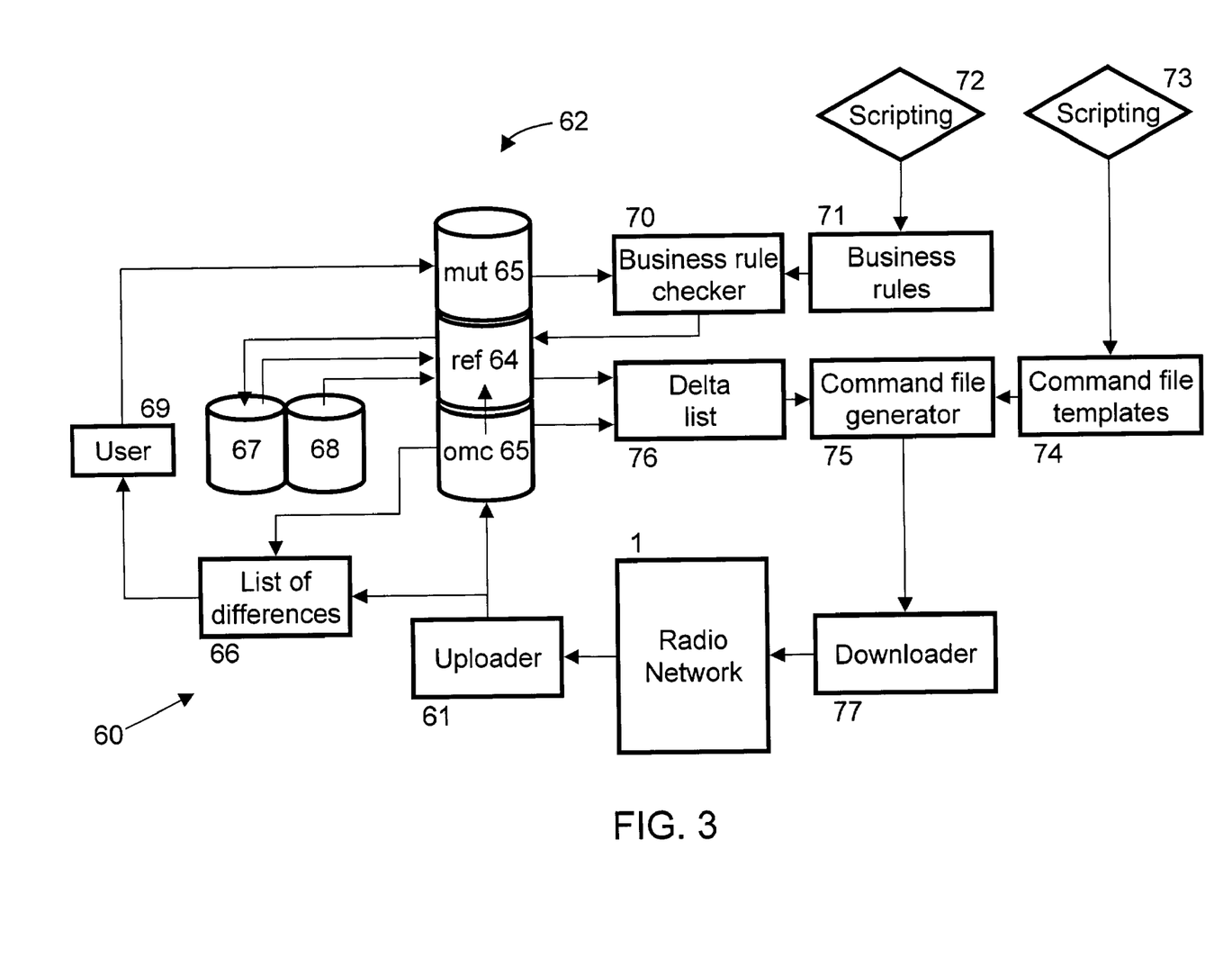
FIG. 3 shows a detailed scheme of the parameter management.

FIG. 3 shows an example of a process flow according to a preferred embodiment of the invention. The parameters and/or values uploaded from the radio network 1 may originate from each of the hierarchical levels shown in FIG. 2. E.g. in the case of the Nokia hierarchy 11 the parameters may be uploaded from the Nokia omc 25, whereas in case the Ericsson hierarchy 12 is applied parameters obtained from the Ericsson MSC 20 may be uploaded. The database 62 can be distinguished into three parts indicated as omc 63, ref 64 and mut 65. The omc part contains the operational parameters and values as set for the radio network. The ref part 64 contains the preferred new or changed parameters and values to be implemented in the radio network. The mut part 65 contains the parameters and values that are subject to a change proposal from user 69. A database with frequency plans 67 and a database with location data 68 can be present. A list of differences 66 can be generated containing the differences between the actual radio network and its representation in the omc part of the database. The user 69 handles the list of differences and can choose to change some parameter values. A system administrator may add or delete parameters. All these changes are made into the mut part 65 of the database 62. The mutated parameters are checked by the business rule checker 70 and put in the ref part 64 of the database 62 if the changed parameters obey the business rules applied to them or no business rule exists for the changed parameter or value. A delta list 76 is generated holding the values of the parameters that differ from the original values. These parameter values are implemented in the radio network 1 by means of a command file generator 75 and a downloader 77. Both the business rule modules and the command file are scripts as indicated by 72 and 73.

The method and system according to an aspect of the invention relate to the management and control of the various parameters in a cellular radio network. Therefore, the various parameters and/or values can be stored in a database, indicated by 62 in FIG. 3. This database might be a commercially available database such as MS Access or Oracle. The method and system according to an aspect of the invention for storing the parameters and/or values uses a technique which will be referred to as the compressed row technique. One of the advantages of this technique is a simplification of manipulating data within a given database. Furthermore, this technique limits the number of records to an acceptable level and new parameters may be added easily. Also, differences between sets of parameters can be obtained quickly by comparison between the relevant strings instead of comparing individual parameters.

Basically, the compressed row technique involves a convenient database which is linked to a descriptive database. Therefore, a database applying compressed row techniques contains at least two separate parts. The first part may store the real data as strings; the second part may contain the descriptive information needed to process the real data from the first part. The second part will be referred to as the repository.

A preferable mechanism to apply the compressed row technique comprises the following steps. For every hierarchical level of the radio network 1, a parameter table is formed in the database 62. In this parameter table, all the parameters of all elements in the radio network of that hierarchical level are stored. For each element, the parameters are divided into parameter groups, each parameter group containing a string (compressed row) storing multiple parameters that may be divided by semi-colons. Each group of parameters has a number assigned to it that indicates the nature of the group. Finally, each group of parameters includes an identifier corresponding to the element. In the repository table for each parameter, the group and the field within that group for that parameter are stored. To find the relevant element corresponding to an element identifier a hierarchy table is used. Various level-tables link the element identifiers to the parameter strings.

A simple example will clarify the mechanism described. Suppose that the value of the parameter BS_TX_PWR_MAX of base station 8662 (the maximum transmission power of that particular base station) is being sought. The hierarchy table HIERARCHY_OMC_BTS contains a base station with identifier 8662. Next it is deduced from the repository that the parameter being sought is e.g. located in parameter group 2 in field 9. The repository indicates moreover that the value on this location is expressed in dBm. The level table BTS_OMC then indicates that for this particular BTS a parameter string for group 2 exists containing e.g. the string 1;8;1;4;1;8;1;1;0;15;1;0;0;2;0;0;0; 0; ; ; ; ;. The $9^{th}$ value in this string is 0 which probably indicates that the BTS with identifier 8662 is not active.

The example above is a simplified case. There are values of parameters that cannot be obtained in this direct way, but have to be obtained indirectly by means of a translate table. In that case, the parameter has a translate identifier in the repository. By means of a field identifier, uniquely defining the parameter, the value of the parameter can be obtained from the translate table.

The business rule checker 70 performs a control function before parameters and/or values are implemented in the cellular radio network. In most cases, there is an interdependency of the various parameters and values of parameters and therefore checking of new and mutated parameters and values before implementation in the network is preferable. However, not only the bare technical sufficient requirements set for the various parameters should be checked. Since contemporary cellular radio networks have reached a considerable amount of complexity, several other non-technical requirements, as, e.g., administrative data should preferably be checked as well. As e.g. the operators administration indicates all cells for 900 MHz GSM with a cell_id starting with #1 and all cells for 1800 MHz DCS with cell_id starting with #6, these requirements should be part of the business rule check as well before configuration or reconfiguration of the network takes place.

Moreover, it is preferable that the bare technically sufficient requirements can be altered according to rules obtained from daily operational use of the radio network. It can, e.g., be technically sufficient to have a channel distance of 20 Hz between different cells. All channel distances above this value then will pass the bcc/bcch consistency check. However, in practice it may be that a channel difference of 50 Hz between the cells guarantees a more reliable operation. In that case, according to the invention, it is possible to use the preferred channel distance of 50 Hz as obtained from the operational practice as a business rule instead of the technically sufficient channel distance. Such a technical requirement will hereinafter be referred to as a preferred technical requirement.

The business rule checker 70 can use the hierarchy tables from the repository part of the database 62. The business rules may be formulated by the user and implemented as a script.

Figure 4A:
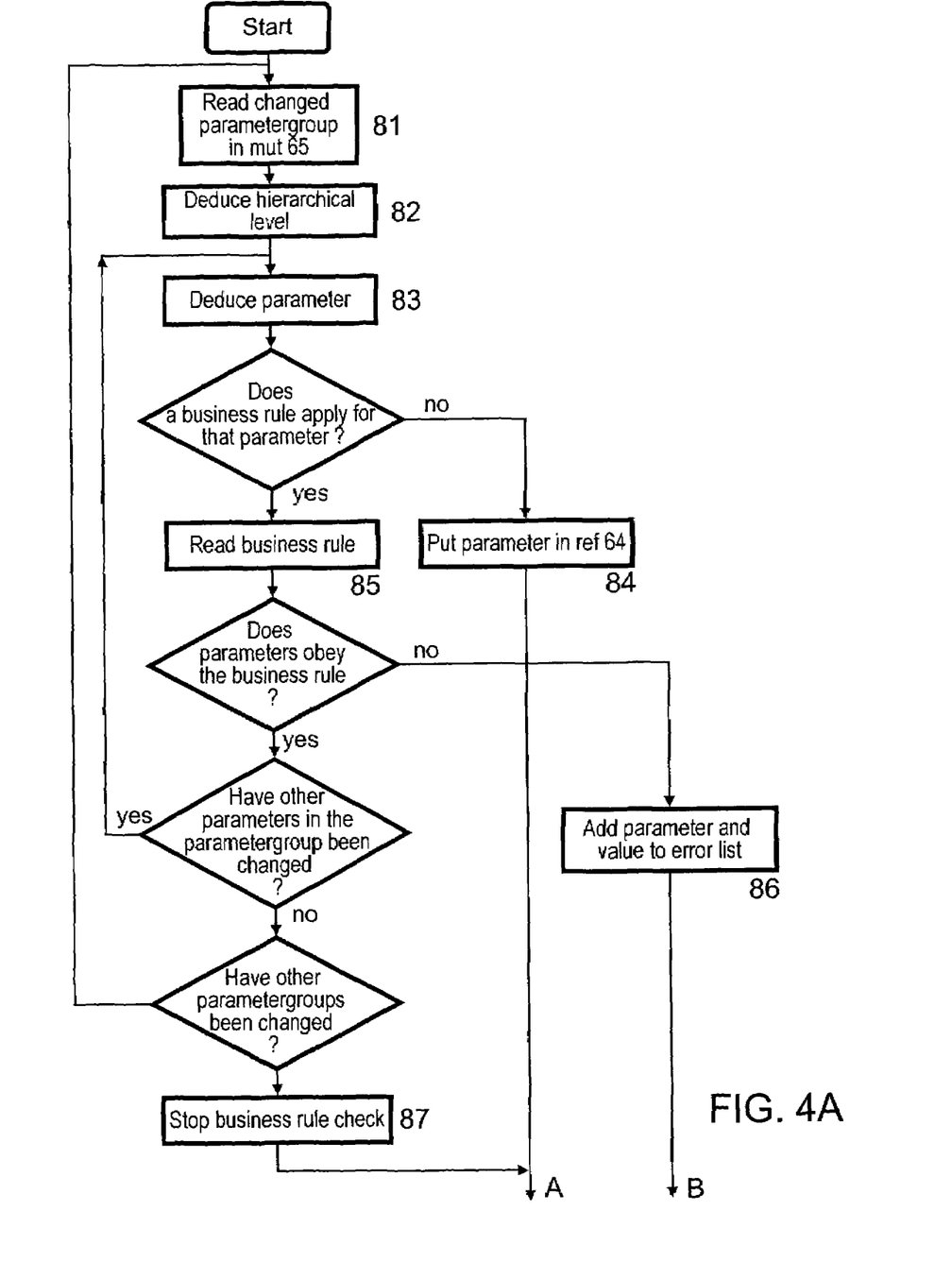
FIGS. 4A,B shows a flow-chart illustrating an example of the business rule checking process.
Figure 4B:
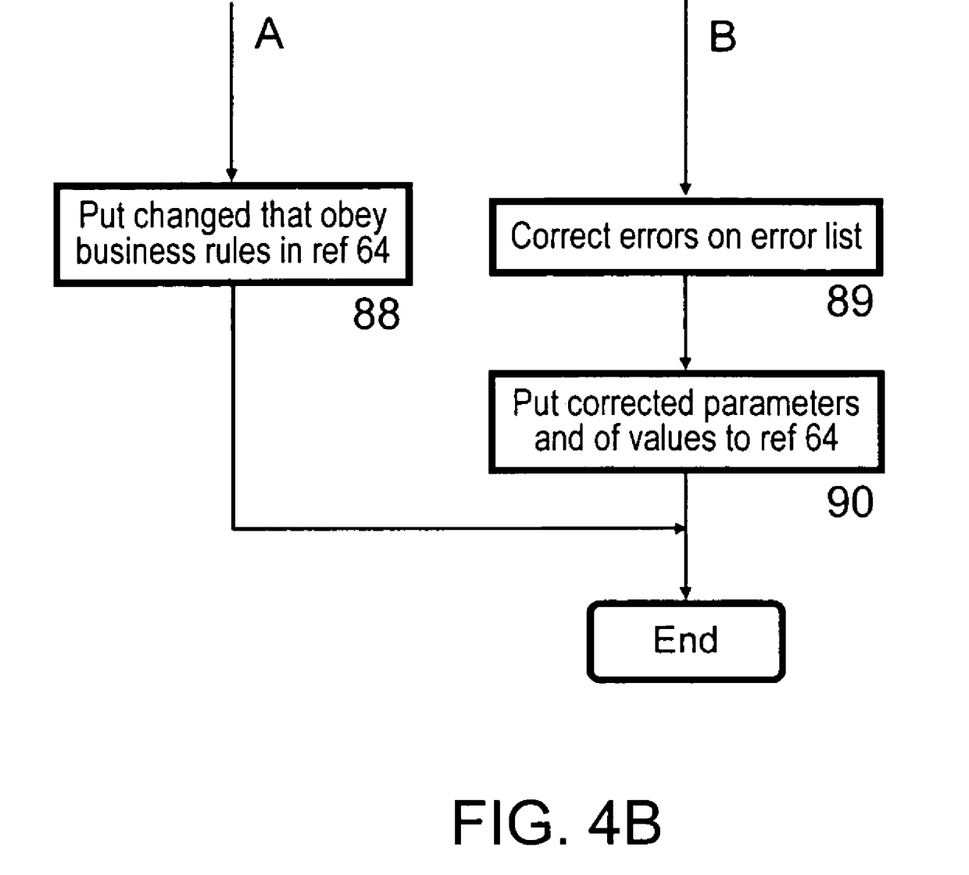

FIGS. 4A and 4B show a flow chart to illustrate schematically the application of business rules to parameter changes for the radio network 1 as proposed by the user 69. In the first step 81, a parameter group that is changed in mut 65 is read. Next, the hierarchical level is determined from this parameter group at 82 and subsequently the parameter is found at 83. For this parameter, it may be that no business rule has been defined or programmed. In that case 84, the parameter is put directly into the ref part 64 of database 62 and is ready to be implemented in the radio network 1. If a business rule does exist for the particular parameter, that business rule is read at 85. It is checked whether the parameter does obey the business rule. If the parameter does not obey the business rule an error list is generated and the parameter and corresponding value are put on that list at 86. If the parameter does obey the business rule defined or programmed for that parameter, the next step is to find out whether other parameters have been changed that belong to the parameter group under consideration. These parameters may run through the same series of steps as described above. If all the changed parameters have been put to the business rule test as described above, it is determined whether other parameter groups have been changed as well. The same series of steps as described above may be applied to the parameters belonging to that parameter group. Finally if all the parameter groups have been checked, the business rule checker 70 stops at step 87. As a result of the business rule checking process, the parameters that obey the business rules defined or programmed for them are put in the ref part 64 of the database 62 at step 88 and are ready to be implemented in the radio network 1. If the parameters or values do not obey the business rules, the parameters and corresponding values appear on the generated error list and after finalization of the business rule checking of all the parameter groups this error list is put to the user. The user then has to correct the parameters, as shown at step 89. The corrected parameters or values then can be put to the ref part 64 of database 62 as well. Now the complete set of parameters and corresponding values does obey the business rules and is ready to be implemented to the cellular radio network 1. Although in FIGS. 4A and B only individual parameters are checked whether or not they obey a business rule, also relations of parameters can be checked on a business rule (see, e.g., FIG. 6A as discussed below).

Figure 5:
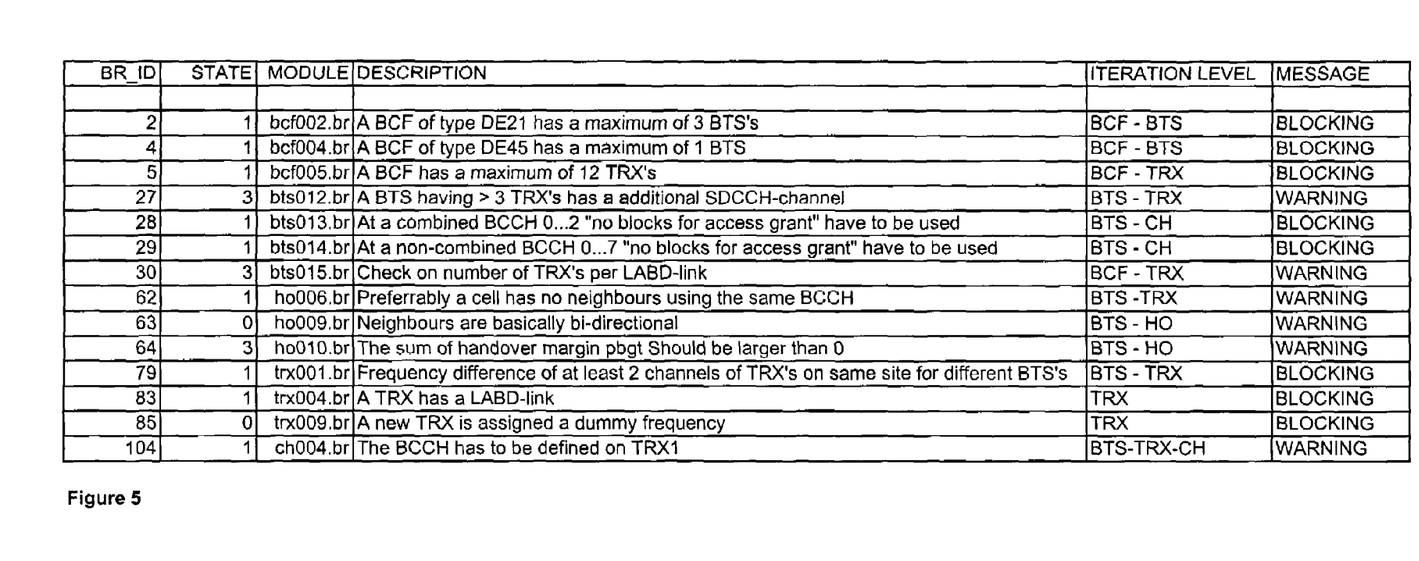
FIG. 5 shows a table of operational examples of business rules.

FIG. 5 shows a table of business rules defined for a particular type of cellular radio network 1. It is stressed that an almost infinite amount of these kinds of business rules can be defined so the rules shown in FIG. 5 only give a few examples. The table shown in FIG.5 shows columns defining a business rule identification number BR_ID, the state of the business rule, the file name or module, the iteration level and the message to be shown when a parameter does not obey the business rule. Additional columns can include e.g. the priority level, author of the business rule, date of modification, version number, remarks etc.

The state of a business rule establishes whether that business rule is taken into consideration when the business rule checking is performed. It is not necessary that all the business rules have to be checked in a particular configuration or reconfiguration project with regard to the radio network. It may be up to the user to select the business rules he wants to apply. However, it may, be that some business rules have to be checked at all times and therefore cannot be put aside by the user. Business rules can, e.g., be applied by running a main script calling the separate business rule modules selected by the user or imposed by the system.

The iteration level relates to the hierarchical level of the elements of the cellular radio network to be checked. Generally, if the business rule is defined or programmed for another element at the same or a higher hierarchical level, then the iteration level will be higher than the highest of the hierarchical levels of all the elements involved for that specific business rule. An example of such a business rule is shown in FIGS. 5 and 6B as module bts013.br. If the business rule is defined for the element internally, the iteration level and the hierarchical level are the same. An example of such a business rule is shown in FIGS. 5 and 6A as module bcf002.br.

The message relates to the messages shown to the user in the generated error list at 86 when a parameter or value does not obey the business rule applied to that parameter or value. These error messages are operator-programmable as well. Different error levels can be distinguished, such as a blocking message (i.e. a serious error indicating that the proposed change may not be implemented in the radio network under any circumstances) or a warning message (i.e. an error indicating that the proposed change is not desirable, but does not do harm to the operation of the cellular radio network if implemented). Other error levels can be used as well, like e.g. engineering messages indicating that the change to be implemented does not achieve the optimal result.

The description column of the table in FIG. 5 defines the business rule in human language. In FIG. 6 the contents of some of the files used for the business rule check are displayed.

Figure 6A:
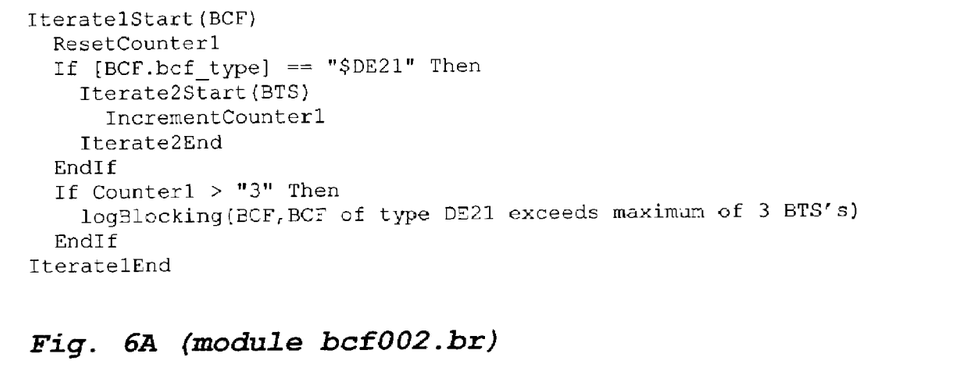
FIGS. 6A–D shows a few business rule modules.
Figure 6B:
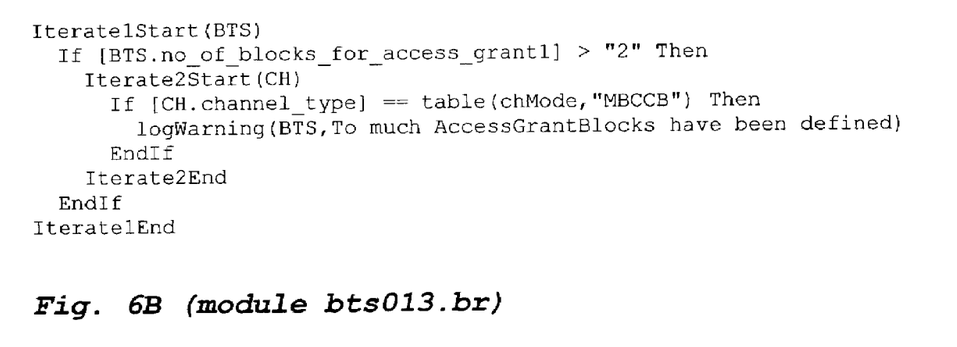

FIGS. 6A–D show a few examples of business rule modules that are also mentioned in the table of FIG. 5. FIG. 6A shows the script of the business rule module bcf002.br, which is a business rule of the administrative kind as mentioned previously. It checks whether the requirement that a BCF 29 of type DE21 has more than 3 BTS's 31 connected according to, e.g., the Nokia hierarchy 12 of FIG. 2. If it does, a blocking message appears on the error list indicating to the user 69 that that particular BCF does have more than 3 BTS's.

FIG. 6B shows the script of the business rule module bts013.br. It states that one Access Grant Block (AGB) is required for each Basic Communication Channel. A blocking message appears if the business rule is not obeyed.

Figure 6C:
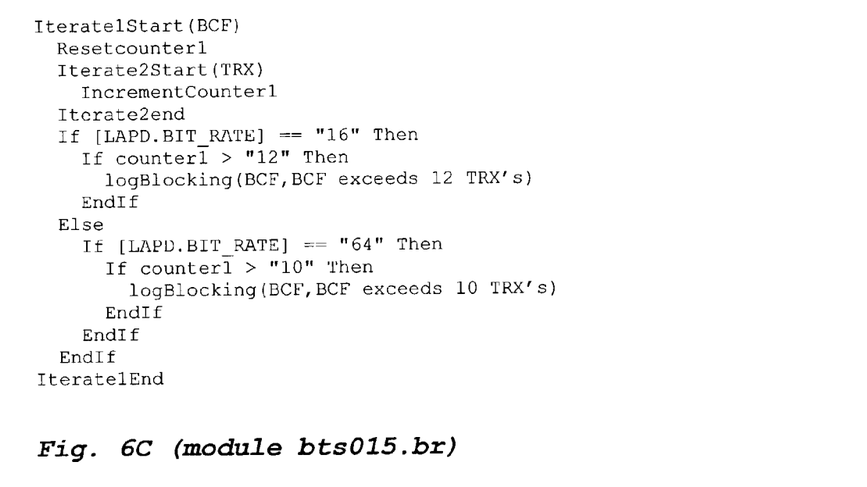

FIG. 6C shows the script of the business rule module bts015.br, which is a business rule of the technical kind as mentioned above. This module checks the number of TRXs for each LABD link. A LABD link basically represents a direct or indirect physical link between two or more BSCs. For a bit rate of 16 respectively 64 a maximum of 12 respectively 10 TRXs is allowed for each LABD link. If this requirement is not obeyed, a blocking message appears on the error list.

Figure 6D:
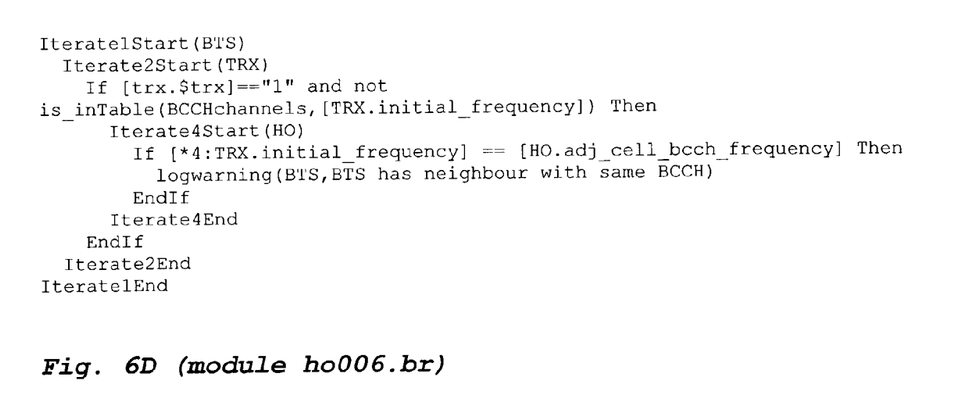

FIG. 6D shows the script of the business rule module ho006.br, which is a business rule of the technical kind as mentioned previously. This module checks whether a cell has neighbor BTS with the same base station communication channel BCCH. A warning message is generated on the error list if this happens to be the case.

It is explicitly stated that the examples and embodiments as described in this section do not limit the scope of the invention in any way. Modifications of the examples and embodiments fall within the scope of this application. E.g. it may be an advantageous to distribute the cellular radio network amongst several geographic regions each of these regions having an operator. Basically the same system of network management, including the business rule checker, can be applied in this situation. Measures can be taken to avoid conflicts when more than one user 69 tries to change the parameter settings in his region, especially around the borderlines of the respective regions. This possible conflict can be solved by allowing only one proposal to change the parameters. The system signals succeeding users trying to change the same parameters that an earlier proposal has already been made including the data of that particular user.

Another modification may be that proposals can be stored instead of being implemented immediately. This option is particularly relevant in the framework of more projects. Several projects can be identified, e.g., mass-updates involving future optimization of large numbers of parameters or the pre-integration of new network elements. More projects may be planned simultaneously based on the same set of data. In order to avoid conflicts between projects, it is possible to establish a 'frozen state' for a limited period.

The invention claimed is:

1. A method for verifying a modified parameter obtained from changing an operational parameter of a component of a radio network, the method comprising the steps of:
    before the modified parameter is implemented in the network, checking the modified parameter on the basis of a rule so as to yield a result, said rule comprising both a technically sufficient parameter setting requirement and a deviation from the setting requirement based on an operational requirement deduced from use of the radio network; and
    if the result indicates that the rule has been obeyed, storing the modified parameter in the network such that subsequent network operation will respond to the modified parameter.

2. The method recited in claim 1 wherein the checking step comprises the steps of:
    copying the operational parameter from the radio network to a database; and
    changing the operational parameter to the modified parameter.

3. The method recited in claim 2 further comprising the step of generating a non-compliance signal if the modified parameter does not obey the operational requirement.

4. The method recited in claim 3 wherein the non-compliance signal is a file or message displayed to an operator.

5. The method recited in claim 3 wherein the non-compliance signal is programmable.

6. The method recited in claim 2 further comprising the steps of:
  storing the operational parameter in a first part of the database; and
  storing the modified parameter in a second part of the database.

7. The method recited in claim 6 wherein the first and second parts of the database are separate databases.

8. The method recited in claim 1 further comprising the step of storing the operational parameter or the modified parameter in a database using a compressed row technique.

9. The method recited in claim 2 wherein the database comprises a hierarchy table that stores and provides access to the operational parameter and the modified parameter.

10. The method recited in claim 9 further comprising the step of using the hierarchy table in checking whether the modified parameter obeys the rule.

11. The method recited in claim 1 wherein the modified parameter relates to a level of a GSM or DCS network hierarchy.

12. The method recited in claim 11 wherein the GSM network hierarchy has multiple levels, the levels being MSC, OMC, BSC, BCF and/or BTS.

13. The method recited in claim 11 wherein the GSM network hierarchy has multiple levels, the levels being TRX, HO and/or CH.

14. The method recited in claim 11 wherein the modified parameter checking step comprises the step of applying the rule to a level of the GSM, DCS or GPRS hierarchy so as to determine whether the rule has been obeyed.

15. The method recited in claim 11 further comprising the step of checking relationships between different operational and/or modified parameters in the same or different hierarchical levels of the radio network.

16. The method recited in claim 1 wherein the modified parameter relates to a GPRS hierarchy.

17. The method recited in claim 16 wherein the GPRS hierarchy has multiple levels, the levels being MSC, OMC, BSC, SGSN, BCF and/or BTS.

18. The method recited in claim 16 wherein the GPRS hierarchy has multiple levels, the levels being TRX, HO and/or CH.

19. The method recited in claim 1 wherein the rule is programmed, ordered or influenced by an operator of the radio network.

20. The method recited in claim 19 wherein the operational requirement comprises a technically preferable requirement programmed, ordered and/or influenced by the operator.

21. The method recited in claim 1 wherein the operational requirement comprises an administrative requirement.

22. A system for verifying a modified parameter obtained from changing an operational parameter of a component of a radio network, wherein the system comprises:
  a rule checker which, before the modified parameter is implemented in the network, checks the modified parameter on the basis of a rule so as to yield a result, said rule comprising both a technically sufficient parameter setting requirement and a deviation from the setting requirement based on an operational requirement deduced from use of the radio network; and
  a data transferrer which, if the result indicates that the rule has been obeyed, stores the modified parameter in the network such that subsequent network operation will respond to the modified parameter.

23. The system recited in claim 22 further comprising:
  a first part of a database for storing the operational parameter from the radio network; and
  a second part of the database for storing the modified parameter.

24. The system recited in claim 23 further comprising a signal generator which generates a non-compliance signal if the modified parameter does not obey the operational requirement.

25. The system recited in claim 23 further comprising scripting means which define rules and/or error messages that are to be used by the rule checker.

26. A radio network comprising a component having an operational parameter that can be changed to a modified parameter, the network comprising:
  a rule checker which, before the modified parameter is implemented in the network, checks the modified parameter on the basis of a rule so as to yield a result, said rule comprising both a technically sufficient parameter setting requirement and a deviation from the setting requirement based on an operational requirement deduced from use of the radio network; and
  a data transferrer which, if the result indicates that the rule has been obeyed, stores the modified parameter in the network such that subsequent network operation will respond to the modified parameter.

27. The radio network recited in claim 26 wherein the operational parameter and the modified parameter relate to a level of a GSM, DCS or GPRS hierarchy of the radio network.

28. A computer program recorded on a computer readable media and containing computer executable instructions for execution on a computer system, the program comprising software code portions for verifying a modified parameter obtained from changing an operational parameter of a component of a radio network, wherein the instructions when executed cause the computer to:
  check, before the modified parameter is implemented in the network, the modified parameter on the basis of a rule so as to yield a result, said rule comprising both a technically sufficient parameter setting requirement and a deviation from the setting requirement based on an operational requirement deduced from use of the radio network; and
  if the result indicates that the rule has been obeyed, store the modified parameter in the network such that subsequent network operation will respond to the modified parameter.

29. The computer program recited in claim 28 wherein the instructions, when executed, further cause the computer to:
  copy the operational parameter from the radio network to a database; and
  change the operational parameter to the modified parameter.

30. The computer program recited in claim 28 wherein the operational parameter or the modified parameter is stored in a database using a compressed row technique.

31. A data carrier having a computer program recorded thereon, the program containing computer executable instructions for execution on a computer system, the program comprising software code portions for verifying a modified parameter obtained from changing an operational parameter of a component of a radio network, wherein the instructions when executed cause the computer to:

check, before the modified parameter is implemented in the network, the modified parameter on the basis of a rule so as to yield a result, said rule comprising both a technically sufficient parameter setting requirement and a deviation from the setting requirement based on an operational requirement deduced from use of the radio network; and if the result indicates that the rule has been obeyed, store the modified parameter in the network such that subsequent network operation will respond to the modified parameter.

32. The data carrier recited in claim 31 wherein the instructions, when executed, further cause the computer system to:

copy the operational parameter from the radio network to a database; and change the operational parameter to the modified parameter.

* * * * *

UNITED STATES PATENT AND TRADEMARK OFFICE
CERTIFICATE OF CORRECTION

| | | |
|---|---|---|
| PATENT NO. | : 7,092,705 B2 | Page 1 of 1 |
| APPLICATION NO. | : 10/188538 | |
| DATED | : August 15, 2006 | |
| INVENTOR(S) | : Joannes W.M. Oldenburg et al. | |

It is certified that error appears in the above-identified patent and that said Letters Patent is hereby corrected as shown below:

Title Page under the Foreign Application Priority Data item [30] please delete "01203820" and insert --01203820.4-- in its place.

Signed and Sealed this

Third Day of April, 2007

JON W. DUDAS
*Director of the United States Patent and Trademark Office*